May 30, 1933.  F. D'ALEO  1,911,223
BRAKE APPLYING MECHANISM
Filed Nov. 23, 1932
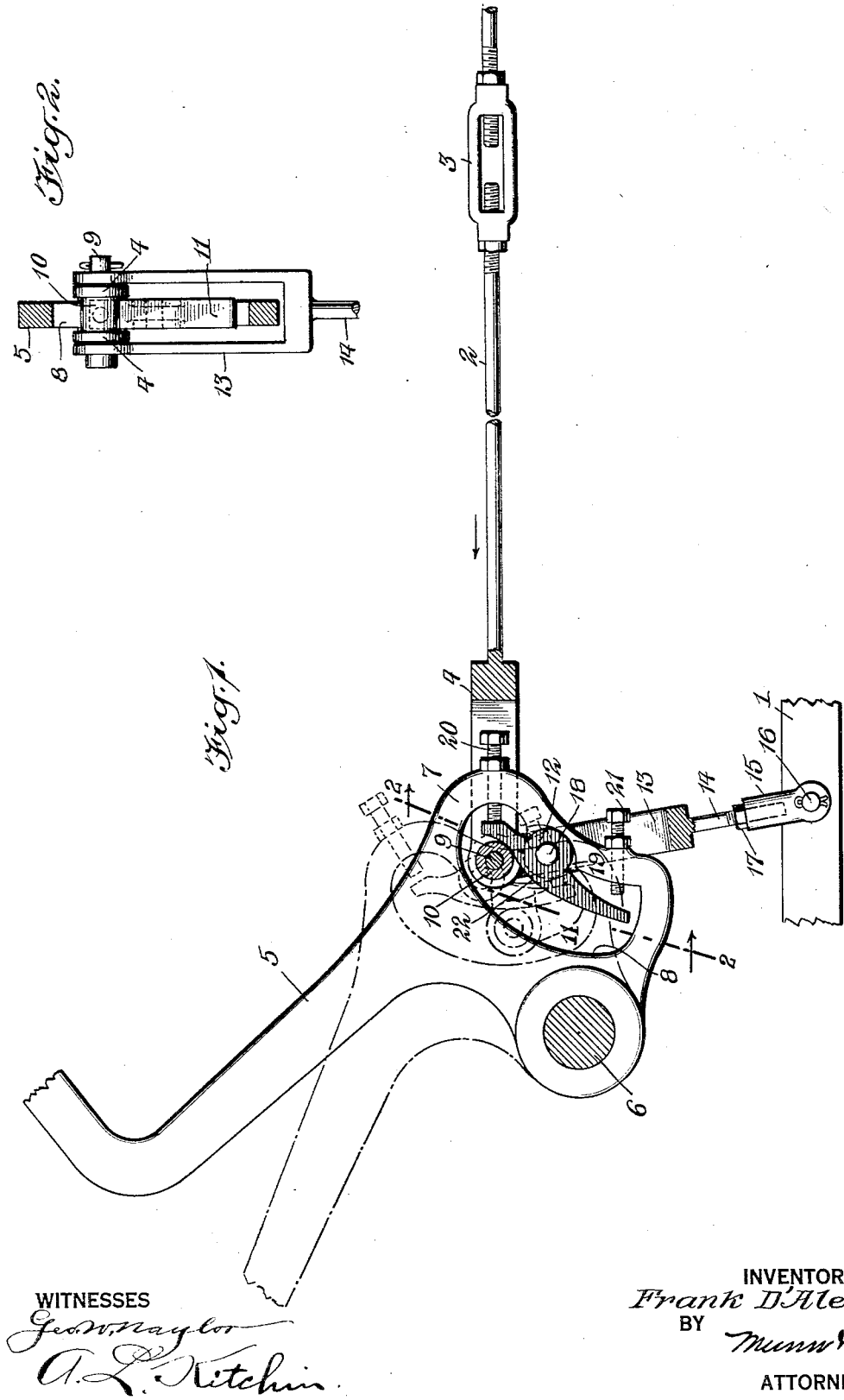
INVENTOR
Frank D'Aleo
BY
Munn & Co.
ATTORNEYS
WITNESSES Patented May 30, 1933

1,911,223

UNITED STATES PATENT OFFICE

FRANK D'ALEO, OF BROOKLYN, NEW YORK

BRAKE APPLYING MECHANISM

Application filed November 23, 1932. Serial No. 644,109.

This invention relates to brake applying mechanism and particularly to an improved mechanism for automobiles of different kinds wherein a structure is presented adapted to give a substantially even action throughout.

Another object of the invention is to provide an improved brake applying mechanism wherein when the brake pedal is applied the resistance starts almost immediately and remains the same throughout the movement of the pedal, while the action on the brakes becomes more and more powerful.

A still further object of the invention more specifically is to provide a brake applying device for automobiles having the usual brake pull rod, wherein a brake pedal is provided and associated parts which vary the fulcrum as the pedal is swung further and further into braking position.

In the accompanying drawing—

Figure 1 is a fragmentary view partly in section showing a brake pedal, pull rod and associated parts disclosing an embodiment of the invention;

Figure 2 is a sectional view through Figure 1, approximately on the line 2—2.

Referring to the accompanying drawing by numerals, 1 indicates a part of a chassis of an automobile or other automotive vehicle, and 2 the usual brake rod now in common use. This brake rod 2 is provided with a turn-buckle 3 so as to readily vary its effective length. The forward or operating end of the rod 2 is provided with a bifurcated fitting 4 which may be integral with the rod or rigidly secured thereto in any desired manner. The end opposite the bifurcated end 4 is connected to the brake structure at the rear of the car or at some other point for the operation thereof. It will be understood that the brake rod 2 may be connected up with both front and rear brakes when four-wheel brakes are used.

Heretofore the usual brake rod as, for instance, rod 2, was pivotally connected to the brake pedal, and as the brake pedal was operated the resistance became greater and greater according to the braking action by the brake shoes of the automobile. In the present instance, the brake pedal 5 is specially constructed and associated with parts fully described hereinafter, whereby there will be substantially the same pressure by the foot throughout the stroke of the brake pedal but the pull on rod 2 becomes greater and greater. The brake pedal is pivotally mounted at 6 in the usual manner and is of substantially the usual shape of brake pedals now in use, except that it is provided with an enlargement 7 having an open or cutaway part 8. The bifurcated fitting 4 straddles part of the enlargement 7 and is provided with a pin 9 carrying a roller 10 which rolls on the surface 11 of the tiltable fulcrum 12. Pin 9 in addition to extending through fitting 4 extends through a bifurcated fitting 13 which is provided with an extension 14 screwed into fitting 15, which latter fitting is journaled on chassis 1 through the action of pin 16. A lock nut 17 acts to lock the extension 14 in various adjusted positions. As the link formed by members 13, 14 and 15 swings, it will cause pin 9 to move in a slight arc, but this arc is so positioned that the forward and rearward movement of the rod 2 is almost in a straight line. The link just described prevents the rising of fitting 4 when the brake pedal is moved downwardly towards the dotted position shown in Figure 1 and, consequently, causes the parts to move forwardly so that the bifurcated fitting 4 and associated parts will move to the dotted position indicated, which is to a full braking position.

The fulcrum 12 is pivotally mounted on pin 18 which is carried by the ear 19, which is integral with the enlargement 7. Set screws 20 and 21 are carried by the enlargement 7 and arranged opposite the respective ends of fulcrum 12 so as to limit the pivotal movement thereof. If desired, both pins could be screwed up tightly against the fulcrum 12, whereupon the fulcrum would be locked against movement. However, the parts are preferably arranged as shown in Figure 1, so that upon first part of the movement of the pedal 5, there will be a substantially direct pull on rod 2, but as the roller 10 moves past the central line, for instance, line or point 22, the fulcrum 12 will swing downwardly until the lower end strikes the set screw 21. This reduces the angle over which the roller 10 must travel, as the pedal 5 continues to move to a braking position. This increases the leverage and, consequently, the power needed to push the pedal 5 further down will be the same although the power exerted on the rod 2 will be greater.

If it is found that when pedal 5 is moved to its furthermost braking position that the brakes are not fully gripping, set screw 21 can be screwed towards fulcrum 12 and thereby increase the angle of the surface 11. If proper adjustment of this kind will not secure the desired results, the turn buckle 3 is adjusted for shortening the effective length of rod 2. By adjusting these two members and also set screw 20 the parts may be correctly set for any braking mechanism now in use. This adjustable feature is very desirable in that the set screws 20 and 21 will be set at one position when the brake linings are new, but as they wear away it may be necessary to adjust the set screws slightly in order to give a further squeezing action. In this way the wear on the brake band may be readily taken up from time to time by the set screws 20 and 21 and meanwhile the power used to depress pedal 5 remains the same.

Also by reason of the construction set forth there is substantially no lost motion, as the pedal 5 begins to pull rod 2 almost immediately after it is started downwardly towards its functioning position. The only lost motion would be in the looseness of the brake band, and with the parts properly adjusted this will not affect the brake pedal 5 to any appreciable extent.

Also by reason of the reduced angle of surface 11, by the swinging movement of fulcrum 12 a great pulling action is secured on the rod 2 with a minimum pressure on the brake pedal 5, thus permitting small and comparatively weak persons to secure full braking action even on a large car.

It will be observed that the drawing and description have referred particularly to mechanical brakes either for the rear wheels or for all four wheels, but it is evident that the invention may be equally applied to hydraulic brakes and the member 4 connected with the usual piston found in hydraulic brakes.

I claim:—

1. A brake applying mechanism comprising a brake rod adapted to be connected to a usual braking mechanism, an actuating pedal, means for pivotally mounting said pedal, a link mounted at a fixed point at one end and pivotally connected on the other end to said rod, and a swingable fulcrum carried by said pedal acting on said brake rod for moving the rod substantially longitudinally when the said brake pedal is functioning.

2. In a brake applying mechanism for automobiles provided with the usual brake structure including a brake rod, a bifurcated fitting carried by the end of said rod, a pivotally mounted brake pedal having an apertured enlargement, said bifurcated fitting straddling said enlargement, a journal member extending across the open end of said bifurcated member and through the aperture in said enlargement, a link pivotally fixed at one end and pivotally connected with said journal member, and a fulcrum carried by said enlargement within said opening, said fulcrum having a substantially ogee shaped cam surface positioned so that said journal member will be resting against one end thereof when the brake lever is in an operative position, said cam surface being also positioned so that when the brake lever is caused to function to its full extent said journal member will move over said surface from substantially one end to the other.

3. A brake applying mechanism including a brake pedal having an enlargement near its pivotal point, said enlargement having substantially an arc shaped aperture, means extending from the brake rod of the automobile upon which the device is mounted, said means extending into said aperture, a link anchored at one point and connected to said means within said aperture, and means carried by said enlargement within the aperture presenting a cam surface positioned to engage and act on the connection between said link and said means for pulling said rod when the brake pedal is moved to operative position.

4. A brake applying mechanism for automobiles provided with brakes having a brake rod, a fitting extending from said brake rod, a pivotally mounted brake pedal, said brake pedal having an enlargement on one side of the pivotal mounting, said enlargement being provided with an opening, a link pivotally connected with said fitting, said link being anchored at one end so as to swing, and means carried by said enlargement presenting a cam surface for the means which connects the link and fitting, whereby when said brake pedal is moved towards an operative position said rod will be pulled to the braking position with gradually increasing leverage.

5. In a brake applying mechanism for automobiles having brake rods, a fitting carried by said brake rod, a pin extending through said fitting, a roller surrounding said pin, a link anchored at one end at a fixed point to be permitted to swing around the fixed point, said link at the opposite end being connected with said pin, a pivotally mounted brake pedal and an adjustable cam carried by said brake pedal positioned so that its cam surface will engage said roller and move the roller, fitting and rod toward the braking position as the pedal moves to the braking position, said cam causing a gradual increasing leverage as it moves from one position to another during the braking action.

6. A brake applying mechanism for automobiles provided with a brake rod, comprising a fitting extending from the brake rod and provided with a bearing member, a link pivotally mounted at one end at a given point and at the other end connected with said bearing member, said link extending normally almost at right angles to the direction of said rod, a pivotally mounted brake lever, a cam pivotally mounted on the brake lever and provided with a curved cam surface adapted to engage said bearing member, and means at the respective ends of said cam for adjusting the position of said cam surface.

7. In a brake applying mechanism of the character described, a brake pedal pivotal at a given point, said pedal having an enlargement near the pivotal point, said enlargement having an opening, a pivotally mounted cam carried by said enlargement and positioned in said opening, a set screw carried by said enlargement positioned to swing said abutment to different positons to secure a desired adjustment, and means extending from the braking mechanism engaging the surface of said cam so that said means will be pulled longitudinally when said brake pedal is moved to operative position.

8. In a brake applying mechanism for the brake of an automobile, a brake rod for causing the brake mechanism to function, a link having one end pivotally connected to part of the chassis of an automobile and the other end to one end of said brake rod, a swinging cam engaging the connection between said link and said rod, a pivotally mounted brake pedal, means for mounting said cam on said brake lever, a pair of set screws carried by said brake lever and positioned to adjust the operative position of the respective ends of the cam and to limit the swinging movement thereof.

9. In a device of the character described, a brake pedal having an enlargement at its pivotal point with an opening in the enlargement, a cam pivotally mounted on the enlargement and fitting within the opening, said cam having a substantially ogee cam surface, and means carried by said surface connected with the braking mechanism of the automobile to cause said braking mechanism to function when said pedal has been moved to braking position.

10. In a brake applying mechanism for the brakes of an automobile, a brake rod for causing the brake mechanism to function, a link having one end pivotally connected to part of the chassis of the automobile and the other end to one end of said brake rod, said link being longitudinally adjustable to vary its effective length, a swinging cam engaging the connection between said link and said rod, a pivotally mounted brake pedal, means for mounting said cam on said brake pedal, a pair of set screws carried by said brake pedal and positioned to adjust the operative position of the respective ends of said cam and limit the swinging movement thereof.

FRANK D'ALEO.